United States Patent
Koivukunnas et al.

(10) Patent No.: US 7,827,907 B2
(45) Date of Patent: Nov. 9, 2010

(54) DEVICE AND A METHOD FOR PRODUCING A DIFFRACTIVE MICROSTRUCTURE

(75) Inventors: Pekka Koivukunnas, Järvenpää (FI); Raimo Korhonen, Tampere (FI); Matti Koivu, Oulu (FI)

(73) Assignee: Avantone Oy, Tampere (FI)

( * ) Notice: Subject to any disclaimer, the term of this patent is extended or adjusted under 35 U.S.C. 154(b) by 242 days.

(21) Appl. No.: 11/660,054

(22) PCT Filed: Aug. 5, 2005

(86) PCT No.: PCT/FI2005/050286
§ 371 (c)(1),
(2), (4) Date: Jul. 21, 2008

(87) PCT Pub. No.: WO2006/016004
PCT Pub. Date: Feb. 16, 2006

(65) Prior Publication Data
US 2009/0134534 A1  May 28, 2009

(30) Foreign Application Priority Data
Aug. 13, 2004  (FI) .................................. 20045293

(51) Int. Cl.
*B31F 1/07*  (2006.01)
*B29C 59/02*  (2006.01)

(52) U.S. Cl. ........................... 101/32; 101/22; 264/293; 425/385

(58) Field of Classification Search ................. 264/293; 425/385; 101/3.1, 5, 27, 28, 32
See application file for complete search history.

(56) References Cited

U.S. PATENT DOCUMENTS

| | | | |
|---|---|---|---|
| 1,855,198 A | 4/1932 | Oswald | |
| 4,589,686 A | 5/1986 | McGrew | |
| 4,913,858 A | 4/1990 | Miekka et al. | |
| 5,164,227 A | 11/1992 | Miekka et al. | |
| 5,862,750 A * | 1/1999 | Dell'Olmo | 101/32 |
| 6,759,182 B2 | 7/2004 | Ikeda et al. | |
| 7,280,230 B2 * | 10/2007 | Shchegrov et al. | 356/630 |
| 2003/0173046 A1 | 9/2003 | Jaaskelainen et al. | |

FOREIGN PATENT DOCUMENTS

| JP | 11147255 A | 6/1999 |
|---|---|---|
| WO | WO 03/054475 A2 | 7/2003 |

OTHER PUBLICATIONS

PCT/ISA/210—International Search Report.
PCT/IPEA/409—International Preliminary Report on Patentability.

* cited by examiner

*Primary Examiner*—Kat Wyrozebski
*Assistant Examiner*—Robert J Grun
(74) *Attorney, Agent, or Firm*—Venable LLP; Eric J. Franklin

(57) ABSTRACT

Micro-protrusions, which constitute a diffractive microstructure, are produced by embossing the surface layer of a substrate by an embossing member having microgrooves in such a way that the cross-sectional area of a produced micro-protrusion is substantially smaller than the cross-sectional area of the microgroove producing said micro-protrusion. Thus, the embossing pressure is small, the risk of adhesion is reduced, it is possible to use a low embossing temperature, and microstructures may be produced at a high speed. Furthermore, the same embossing member may be used for producing a low microstructure, a normal microstructure, and a high microstructure.

10 Claims, 11 Drawing Sheets

DEVICE AND A METHOD FOR PRODUCING A DIFFRACTIVE MICROSTRUCTURE

CROSS-REFERENCE TO RELATED APPLICATIONS

This application claims priority to Finnish patent application 20045293 filed 13 Aug. 2004 and is the national phase under 35 U.S.C. §371 of PCT/FI2005/050286 filed 5 Aug. 2005.

The present invention relates to a device and a method for producing a diffractive microstructure on the surface layer of a substrate by embossing.

BACKGROUND OF THE INVENTION

Diffractive microstructures may be attached to products e.g. for the visual effect given by them, or for authenticating the product.

Diffractive microstructures may be produced e.g. by embossing the surface layer of a substrate coated with a suitable lacquer. The coated substrate is pressed between an embossing member and a backing member in the embossing process. The surface of the embossing member comprises microgrooves, which correspond to the microstructure to be produced. The backing member supports the substrate from the back side during the embossing process such that a sufficient pressure, the embossing pressure, may be directed to the surface layer of the substrate in order to shape the surface to correspond to the microgrooves of the embossing member. It is advantageous for the shaping of the surface of the substrate if the surface layer is plasticized by heating. The temperature of the surface of the substrate during the embossing process is herein called the embossing temperature.

U.S. Pat. No. 4,913,858 discloses a method for producing a diffractive microstructure on the surface layer of a paper coated with a thermoplastic material. The microstructure is formed to the coating by means of a heated embossing roll.

According to the prior art solutions, the diffractive microstructure giving the visual effect is produced in such a way that it corresponds to the microgrooves on the surface of the embossing member, as well as possible.

SUMMARY OF THE INVENTION

The primary object of the present invention is to reduce forces needed in the embossing. A further object of the present invention is to minimize operating problems in the embossing process. Yet another object of the present invention is to allow producing a microstructure giving a weak visual effect, a microstructure giving a strong visual effect, and a wear-resistant microstructure by using the same embossing member.

To attain these objects, the method and the embossing device according to the invention are primarily characterized in that the cross-sectional area of at least one micro-protrusion produced on the surface layer of the substrate is, during the whole producing, smaller than or equal to 0.9 times the cross-sectional area of the microgroove producing said micro-protrusion.

During the producing of the microstructure, ambient gas, normally air, remains in the microgrooves. The gas is compressed when the volume of the air space defined by the micro-protrusion and the microgroove is becomes smaller. The pressure prevailing in the air space is high if the shape of the micro-protrusion is to follow the shape of the corresponding microgroove as closely as possible. The high gas pressure increases the embossing force, which has to be directed to the embossing member in order to produce the microstructure. If the embossing member is brought quickly onto the surface of the substrate, the entrapped gas cannot exit through the narrow gap between the embossing member and the substrate, which further increases the gas pressure in said air space.

When the cross-sectional area of the micro-protrusion is, according to the invention, smaller than or equal to 0.9 times the cross-sectional area of the microgroove providing said micro-protrusion, the microstructure may be produced by using a considerably lower embossing pressure than in a situation in which the ratio between said cross-sectional areas were close to one.

According to the invention, it is possible to reduce the embossing pressure required for the producing of the microstructure as well as the embossing force directed to the embossing member. Deflection of the structures of the embossing device is reduced, and consequently, the structures of the embossing device may be made slimmer and lighter in weight.

The embossing member and the backing member are advantageously rotatable rolls. However, the embossing may also be performed by using an embossing member or a backing member which moves linearly. In the case of the linearly moving embossing member, the area of the substrate, which is shaped at one time, is large, wherein the force transmitted by the embossing member is also great. According to the invention, the embossing pressure may be reduced, in which case the area of the linearly moving embossing member may be increased without making the required structures and actuators more robust.

According to the invention, it is possible to reduce the compression of the substrate, e.g. cardboard, during the embossing operation. It is possible to use a lower embossing temperature and thereby to minimize the risk of adhesion. Furthermore, it is possible to minimize the escaping of the surface layer of the substrate from below the embossing member.

If the surface layer of the substrate adheres to the bottom of the microgroove, it is difficult to detach. If this takes place, the result is an operating problem which causes additional work, slows down the production, is manifested in the quality of the produced microstructure, causes deterioration of the substrate, and may even cause damage to the embossing member. According to the present invention, it is possible to reduce the probability that the surface layer of the substrate adheres to the bottom of the microgrooves.

The micro-protrusions of the microstructure have a particular height, which gives an effect, which is as strong as possible. By deviating from the optimum height, it is possible to give a weak effect. In certain cases it may be reckoned that a weak effect in connection with a product creates a more valuable or exquisite impression of the product than a strong effect. The aim may also be to authenticate the product by providing it with a concealed effect, which is weakly detectable. Typically, an unprotected microstructure produced at low temperatures on soft surface materials is easily damaged or smudged, in which case it can also be found out by examining a low microstructure whether the surface has been inappropriately touched, whether the product package has been opened, or whether the product has been otherwise subject to wear.

If an attempt is made to copy the low microstructure, for example, for the purpose of counterfeiting, the height of the micro-protrusions of the copy is typically lower than in the original microstructure. In the case of a low microstructure providing a weak effect, the effect given by the copy is even weaker than the original, which makes it possible to discriminate the copy from the original.

A microstructure which is higher than the optimum will typically provide an effect which is weaker than the maximum but which is, on the other hand, more resistant to wearing and smudging.

According to the invention, the same embossing member may be used to produce a microstructure giving a weak effect, a microstructure giving an effect of maximum strength, as well as a wear-resistant microstructure. This has the advantage that the set-up time of the embossing device may be speeded up when changing from one type of effect to another. Furthermore, several embossing members are not necessarily needed, which makes it possible to reduce costs.

The invention and its fundamental properties as well as the advantages to be attained by means of the invention will become more evident for a person skilled in the art from the claims and the following description, in which the invention will be described in more detail by means of a few selected examples.

DETAILED DESCRIPTION OF THE INVENTION

Figure 1:
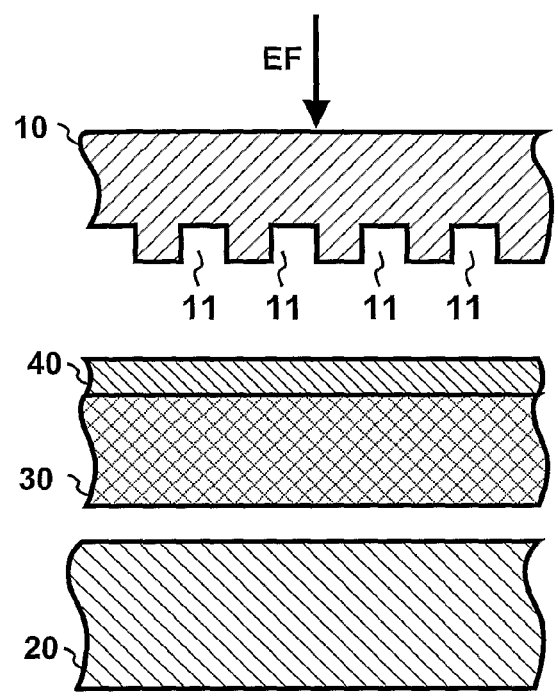
FIG. 1 shows schematically an embossing member, a substrate, the surface layer of the substrate, and a backing member.

Referring to FIG. 1, a microstructure is produced on the surface layer 40 of a substrate 30 by pressing the substrate 30 between an embossing member 10 and a backing member 20 in such a way that the surface layer 40 of the substrate 30 is shaped to correspond to the microgrooves 11 on the surface of the embossing member 10. An embossing force EF is directed to the embossing member 10. The local, i.e. spatial differences of an embossing pressure directed by the surface of the embossing means 10 to the surface layer 40 of the substrate 30 cause local material flow and/or compression in the surface 40 of the substrate. The Poisson's ratio for the surface material is advantageously substantially equal to 0.5, in which case the surface material is substantially not compressed during the embossing operation but the shaping takes place primarily as a result of material flow.

The substrate 30 may be, for example, paper, cardboard or plastic. The surface layer 40 of the substrate 30 may be, for example, a thermoplastic polymer, such as polyvinyl chloride or polycarbonate, whose viscosity is reduced at a high temperature. Examples of such materials are listed, for example, in U.S. Pat. No. 4,913,858. The surface layer 40 of the substrate 30 may also consist of a material that contains finegrained mineral, e.g. kaolin. Moreover, the surface layer 40 of the substrate 30 may consist of a UV curable lacquer. The microstructure may also be embossed on printing ink as disclosed in U.S. Pat. No. 5,873,305. The substrate 30 and its surface layer 40 may consist of the same material. The embossed surface layer 40 may be coated with a metal film to strengthen the visual effect. The embossed surface layer 40 may be coated with a transparent protective film.

The surface layer 40 of the substrate 30 may comprise several zones which contain a similar or different diffractive microstructures to provide a desired colour effect, motion effect, two-dimensional pattern, pattern depending on the direction of viewing, animation, pattern providing a three-dimensional impression, or visually invisible microstructure. A part of the surface layer 40 may be left unembossed. The surface layer 40 may also comprise patterns or symbols produced with a dye. These may be produced before, simultaneously with or also after the embossing. The patterns provided with a dye and the produced diffractive microstructures may overlap in whole or in part.

The backing member 20 may be, for example, a rotating roll coated with an epoxy resin. The embossing member 10 may be, for example, a plate made of a nickel-based material, on which plate microgrooves 11 corresponding to the desired microstructure are implemented by optical and electrolytic methods. A method for making such a plate is described, for example, in U.S. Pat. No. 3,950,839. The plate is bent and welded to form a cylinder, which is placed on top of a roll arranged to be rotatable. A method for bending and welding the cylinder is disclosed, for example, in U.S. Pat. No. 6,651,338. As the rolls are rotated, the substrate 30 and its surface layer 40 are pressed such that a microstructure corresponding to the surface of the embossing member 10 is formed onto the surface layer 40.

Figure 2A:
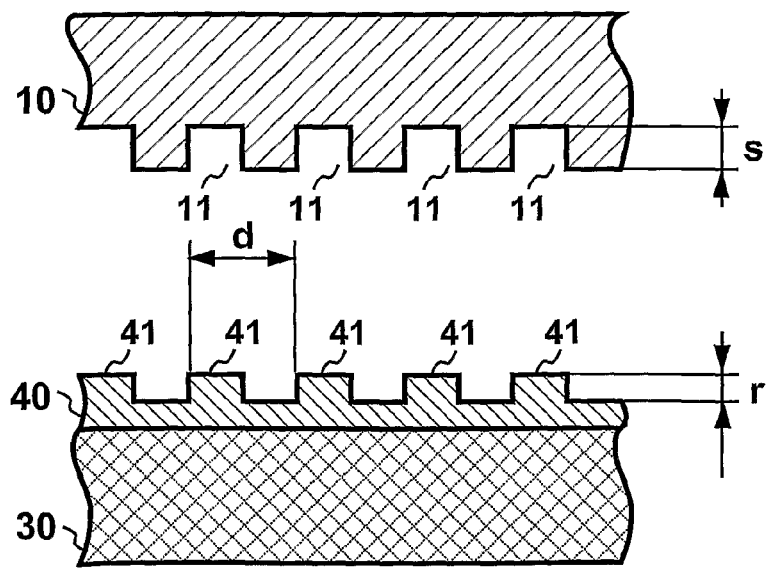
FIG. 2a shows schematically the embossing member and microprotrusions produced on the surface layer of the substrate.

With reference to FIG. 2a, each microgroove 11 of the embossing member 10 produces a corresponding micro-protrusion 41 on the surface layer 40 of the substrate 30. The diffractive microstructure embossed on the surface layer 40 of the substrate 30 consists of several periodically organized micro-protrusions 41 which recur at least in one direction at positions, which are separated by the so-called grating constant d. The value of the grating constant and the orientation of the micro-protrusions may vary in different locations of the surface, wherein the desired diffractive effect or holographic pattern is obtained.

For each micro-protrusion 41, it is possible to define the height r between the highest point and the lowest point, which height is in the direction perpendicular to the macroscopic surface. For each microgroove 11 of the embossing member 10 it is possible to define a depth between the highest point and lowest point, which depth is in the direction perpendicular to the microscopic surface, respectively. According to the present invention, it is advantageous that the height r of the micro-protrusion 41 is substantially smaller than the depth s of the microgroove 11 producing said micro-protrusion 41.

It is possible that the surface layer 40 of the substrate 30 is made of a material, which is elastic to some extent; in other words, the produced form tends to recover to some extent after the removal of the embossing member 10. It is emphasized that the height r of the micro-protrusion 41 may be greater during the action of the embossing pressure than after the embossing.

Figure 2B:
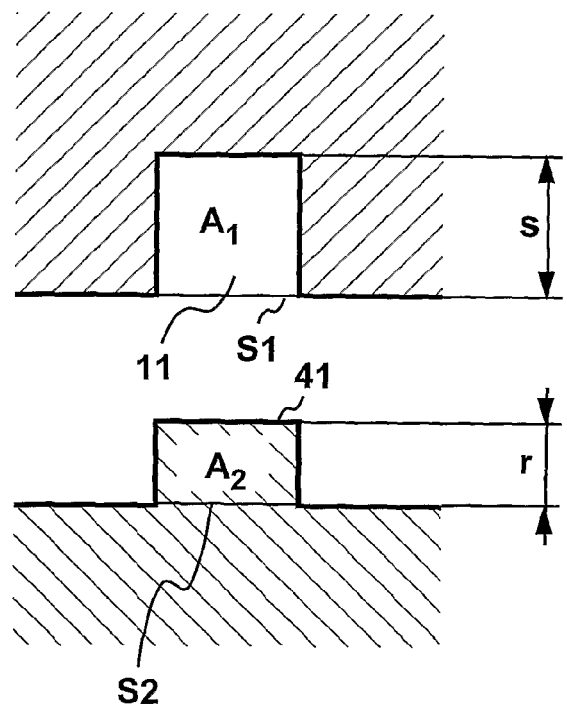
FIG. 2b shows, in general, the cross-sectional areas of a microgroove and a micro-protrusion.
Figure 2C:
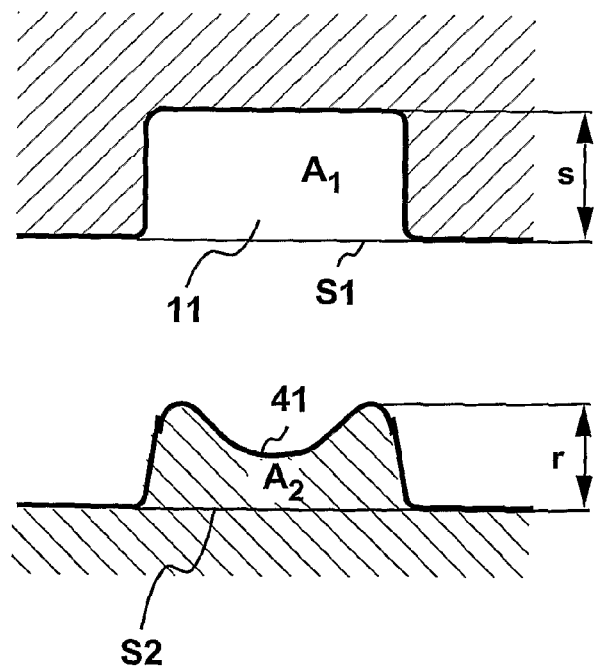
FIG. 2c shows the cross-sectional areas of a microgroove and a micro-protrusion especially when the shape of the micro-protrusion is different from a rectangular shape.

With reference to FIG. 2b, the cross-sectional area $A_2$ of each micro-protrusion 41 is defined by a line S2 connecting the lowest points on the both sides of the micro-protrusion 41 and by the profile of the micro-protrusion 41. The cross-sectional area $A_1$ of the microgroove 11 is defined by a line S1 touching the microgroove 11 on the both sides and by the profile of the microgroove 11, respectively. With reference to FIG. 2c, it is noticed that said cross-sectional areas $A_1, A_2$ are also defined in the case in which the shape of the micro-protrusion 41 and/or the microgroove 11 is different from the rectangular shape.

The cross-sectional areas $A_1, A_2$ may vary in different points in the longitudinal direction of the microgroove 11 and/or of the micro-protrusion 41. The cross-sectional area $A_2$ of the micro-protrusion 41 is equivalent with the concept of local cross-sectional area $A_2$ of the micro-protrusion 41. The cross-sectional area $A_1$ of the microgroove 11 is equivalent with the concept of the local cross-sectional area $A_1$ of the microgroove 11, respectively. The ratio between the cross-sectional areas $A_1, A_2$ is calculated by selecting a location of the microgroove to be considered, by defining a location of the micro-protrusion 41 produced by said considered point of the microgroove, and by using the values of the cross-sectional areas $A_1, A_2$ at said considered location and said produced location.

According to the present invention, the cross-sectional area $A_2$ of the micro-protrusion 41 is, during the whole time of producing, substantially smaller than the cross-sectional area $A_1$ of the microgroove 11 producing said micro-protrusion 41. It is emphasized that the cross-sectional area $A_2$ of the micro-protrusion 41 may be greater during the action of the embossing pressure than after the embossing.

Advantageously, at least 95% of the surface area of the diffractive microstructure or of the number of micro-protrusions to be produced is produced in such a way that the cross-sectional area $A_2$ of the micro-protrusion 41 is, during the whole producing, substantially smaller than the cross-sectional area $A_1$ of the microgroove 11 producing said micro-protrusion 41.

Furthermore, the volume of each micro-protrusion 41 is defined by the portion of the profile of the micro-protrusion left between the highest point and the lowest point of the micro-protrusion. The volume of each microgroove 11 is defined by the portion of the profile of the microgroove left between the highest point and the lowest point of the microgroove, respectively. According to the present invention, the volume of the micro-protrusion 41 is, during the whole producing, substantially smaller than the volume of the microgroove 11 producing said micro-protrusion 41. Typically, the microgrooves 11 and the micro-protrusions 41 are long when compared with the width of the microgrooves or with the depth s of the microgrooves. It is generally true for the microgrooves 11 and the micro-protrusions 41 that the derivative of the volume with respect to the length is equal to the cross-sectional area. Vice versa, the definite integral of the cross-sectional area over the length is equal to the volume.

Figure 3A:
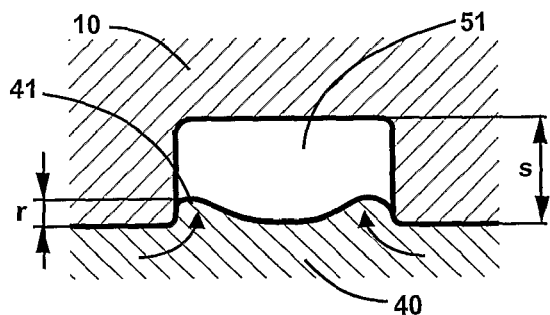
FIGS. 3a to 3e show schematically different stages of forming a micro-protrusion.

FIGS. 3a to 3e show different steps of the formation of the micro-protrusion 41. With reference to FIG. 3a, the embossing member 10 is slightly pressed into the plasticized surface layer 40 of the substrate 30, which causes a flow of material into the microgroove 11, resulting in the formation of the micro-protrusion 41. The microgroove 11 and the micro-protrusion 41 define an air space 51.

Figure 3B:
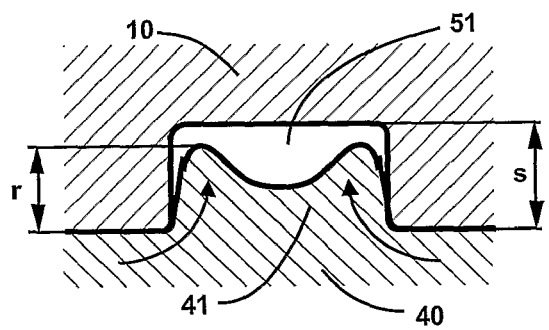

With reference to FIG. 3b, the embossing member 10 is pressed deeper into the surface layer 40 of the substrate 30 than in the case of FIG. 3a. The height r of the formed micro-protrusion is greater than in the case of FIG. 3a but still smaller than the depth s of the microgroove 11. Consequently, the micro-protrusion 41 does not touch the bottom of the microgroove 11. The volume $V_3$ of the air space 51 is smaller than in the case of FIG. 3a. In the situation of FIG. 3b, the pressure prevailing in the air space 51 does not needlessly increase the value of the embossing pressure needed for shaping the surface.

It has been found that a portion lower than the sides of the micro-protrusion often remains in the middle of the formed micro-protrusion 41. Consequently, the top of the micro-protrusion is often concave. This is caused by the flow of the surface material 40 of the substrate in the vicinity of the sides of the microgroove 11. Consequently, the shape of the formed micro-protrusion 41 may be significantly different from the shape of the microgroove 11. As a result of the difference in the shape, the diffraction efficiency of the formed microstructure may also deviate from the optimum.

When the height r of the micro-protrusion 41 is smaller than the depth s of the microgroove 11, the situation is substantially avoided in which surface material of the substrate could adhere to the bottom of the microgroove 11. If material would be adhered to the bottom of the microgroove, this could cause an operating problem of the embossing device.

Figure 3C:
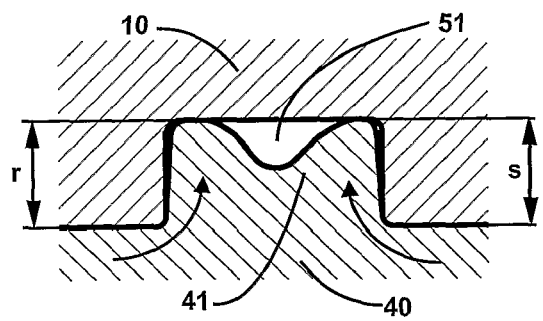

With reference to FIG. 3c, the embossing member 10 is already pressed so deep into the surface layer 40 of the substrate 30 that the formed micro-protrusion 41 touches the bottom of the microgroove 11. Consequently, the height r of the formed micro-protrusion 41 is, at least at the instant of producing in question, equal to the depth s of the microgroove 11. Further, the volume $V_3$ of the air space 51 is smaller than in the case of FIG. 3b, wherein the pressure $p_3$ prevailing in the air space 51 is higher than in the case of FIG. 3b. The situation of FIG. 3c requires a higher embossing pressure than the situation of FIG. 3b, respectively. The tops of the micro-protrusion 41 are formed to correspond to the bottom of the microgroove, in which case the tops are formed flat, at least at the instant of producing. In the situation of FIG. 3c, imprints corresponding to the irregularity of the bottom of the microgroove 11 may also be left on the micro-protrusion 41, indicating that the micro-protrusion 41 has touched the bottom of the microgroove 11. In the case of FIG. 3c, the probability that the micro-protrusion 41 adheres to the bottom of the microgroove 11 is higher than in the case of FIG. 3b.

Figure 3D:
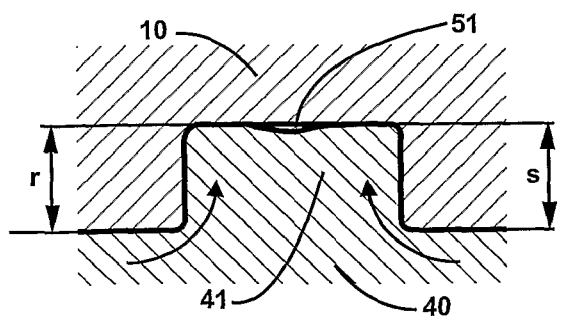

FIG. 3d shows a situation in which the shape of the micro-protrusion 41 substantially corresponds to the shape of the microgroove 11. Consequently, the height r of the formed micro-protrusion 41 is, at least at the instant of producing in question, equal to the depth s of the microgroove 11. The situation of FIG. 3d is disadvantageous, because the volume $V_3$ of the air space 51 is very small and the pressure is, respectively, very high, in which case a very great embossing force is required to provide the situation of FIG. 3d. Also the fact that the shape of the micro-protrusion 41 is forced to correspond to the shape of the microgroove 11 as closely as possible increases the embossing force to a great extent, because a reduction in the radius of curvature of the micro-protrusion 41 may require a greater force, for reasons of surface tension. Furthermore, the sliding of the forming micro-protrusion 41 along the surface of the microgroove 11 requires a greater embossing force than in the case of FIGS. 3a to 3c.

Figure 3E:
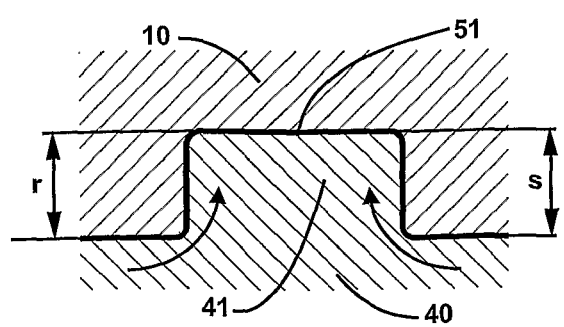

FIG. 3e shows a situation in which the shape of the micro-protrusion corresponds closely to the shape of the microgroove 11. This kind of a situation is possible, if the surface layer 40 of the substrate 30 is permeable to gas, if the embossing is performed in vacuum, or if the embossing member 10 is pressed onto the surface layer 40 of the substrate 30 in such a way that the gas can escape from the air space 51 in the longitudinal direction of the microgrooves 11. The air may escape from the air space 51 for example in a situation in which the embossing member 10 has the shape of a roll and the microgrooves 11 are parallel to the direction SX of movement of the surface layer 40 of the substrate 30. The time required for the exit of the gas may be long.

Figure 4A:
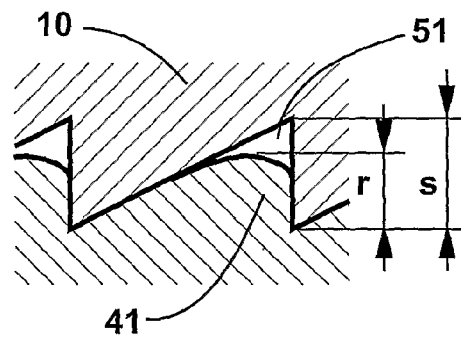
FIG. 4a shows a situation in which the ratio between the cross-sectional areas of a micro-protrusion and the microgroove of an embossing member is substantially smaller than one, said microgroove having a triangular profile.
Figure 4B:
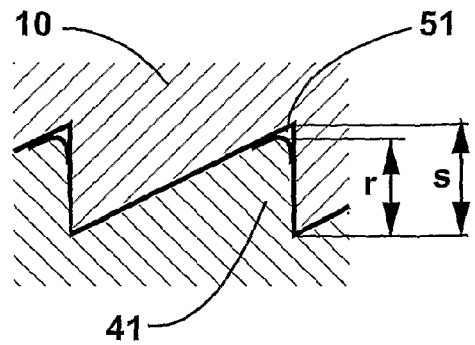
FIG. 4b shows a situation in which the ratio between the cross-sectional areas of a micro-protrusion and the microgroove of an embossing member is almost equal to one, said microgroove having a triangular profile.

With reference to FIGS. 4a and 4b, the profile of the microgroove 11 may also be triangular. The profile may also be asymmetric, to direct the desired diffraction order of a desired wavelength in a given direction with a very good efficiency. In the field of optics, a grating having such a profile is called a blazed diffraction grating.

FIG. 4a shows a situation in which the cross-sectional area $A_2$ of the micro-protrusion 41 is substantially smaller than the cross-sectional area $A_1$ of the microgroove 11. FIG. 4b shows a situation in which the cross-sectional area $A_2$ of the micro-protrusion 41 is unfavourably almost equal to the cross-sectional area $A_1$ of the microgroove 11. The situation of FIG. 4a requires a significantly smaller embossing force than the situation of FIG. 4b.

Figure 5A:
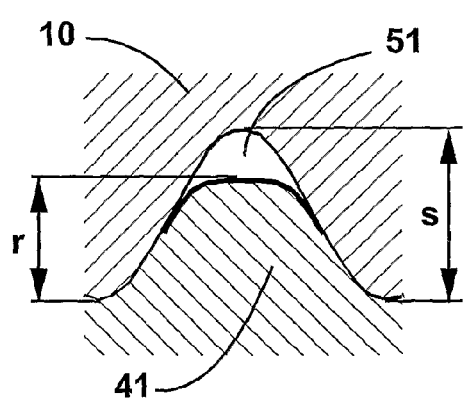
FIG. 5a shows a situation in which the ratio between the cross-sectional areas of a micro-protrusion and the microgroove of an embossing member is substantially smaller than one, said microgroove having a sinusoidal profile.
Figure 5B:
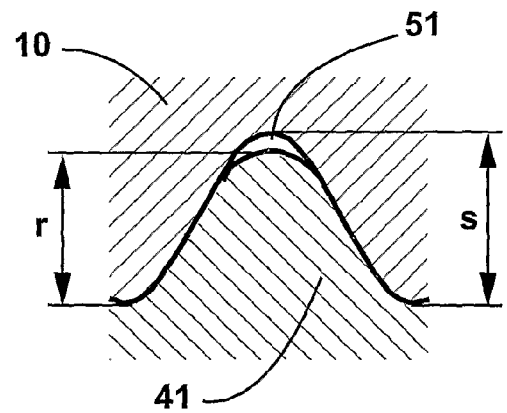
FIG. 5b shows a situation in which the ratio between the cross-sectional areas of a micro-protrusion and the microgroove of an embossing member is almost equal to one, said microgroove having a sinusoidal profile.

With reference to FIGS. 5a and 5b, the profile of the microgroove 11 may also be sinusoidal or a profile consisting of segments of a circular arc. One advantage of such a profile is, among others, that the produced micro-protrusions 41 may be easily separated from the microgrooves, thanks to the large angle of clearance between the microgroove and the micro-protrusion. FIG. 5a shows a situation in which the cross-sectional area $A_2$ of the micro-protrusion 41 is substantially smaller than the cross-sectional area $A_1$ of the microgroove 11. FIG. 5b shows a situation in which the cross-sectional area $A_2$ of the micro-protrusion 41 is unfavourably almost equal to the cross-sectional area $A_1$ of the microgroove 11. The situation of FIG. 5a requires a significantly smaller embossing force than the situation of FIG. 5b.

Figure 6:
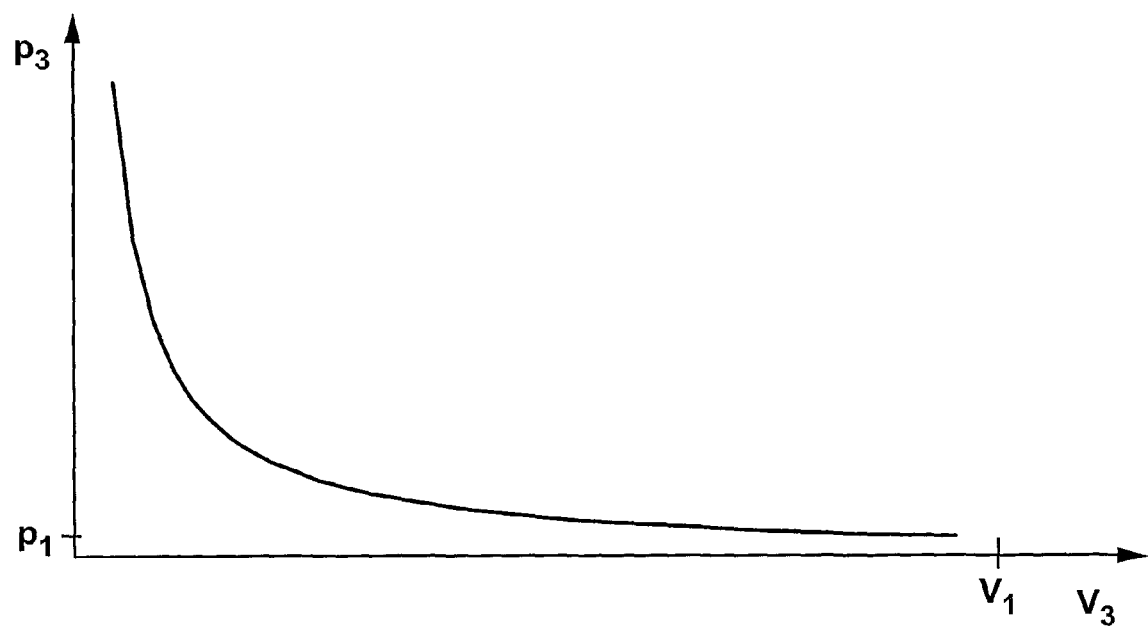
FIG. 6 shows, by way of example, the pressure of an air space left in a microgroove as a function of the volume of the air space remaining in the microgroove.

With reference to FIG. 6, the pressure $p_3$ in the air space 51 remaining between the microgroove 11 and the micro-protrusion 41 increases sharply as the volume $V_3$ of said air space 51 is becomes smaller. In the initial situation, in which the embossing member 10 comprising the microgroove 11 has not yet been pressed into the surface layer 40 of the substrate 30, the pressure $p_3$ in the air space 51 is substantially the same as the pressure $p_1$ in the ambient atmosphere. In such an initial situation, the volume $V_3$ of the air space 51 is substantially the same as the volume $V_1$ of the microgroove 11.

When the cross-sectional area $A_2$ of the micro-protrusion 41 is 0.9 times the cross-sectional area $A_1$ of the corresponding microgroove 11, the volume $V_3$ of the corresponding air space 51 is one-tenth of the volume of the microgroove, and the pressure $p_3$ of the air space 51 is, respectively, at least tenfold compared with the atmospheric pressure, according to the ideal gas law. To overcome such a gas pressure, the required embossing pressure must be increased. In the preferred embodiment, the ratio between the cross-sectional areas $A_2$ and $A_1$ is smaller than or equal to 0.6. Thus, the required increase in the embossing pressure is very small, respectively.

Furthermore, if the compression is performed fast, the pressure $p_3$ of the gas volume 51 is further increased due to the following reasons:

As the embossing member 10 approaches the surface layer 40 of the substrate 30, the entrapped air or other gas cannot escape through the small gap between the embossing member 10 and the surface layer 40 of the substrate 30, in which case the pressure of the air remaining in the microgrooves is greater than the pressure of the ambient atmosphere. Consequently, the embossing member 10 acts as a kind of supercharger.

The embossing member 10 and/or the surface 40 of the substrate is typically heated, and thus the cold gas entrapped in the microgroove 11 is heated to the temperature of the embossing member, wherein the pressure $p_3$ of the gas volume 51 increases.

During the rapid compression, the gas is adiabatically heated, wherein the temperature and the pressure of the gas rise further.

Figure 7:
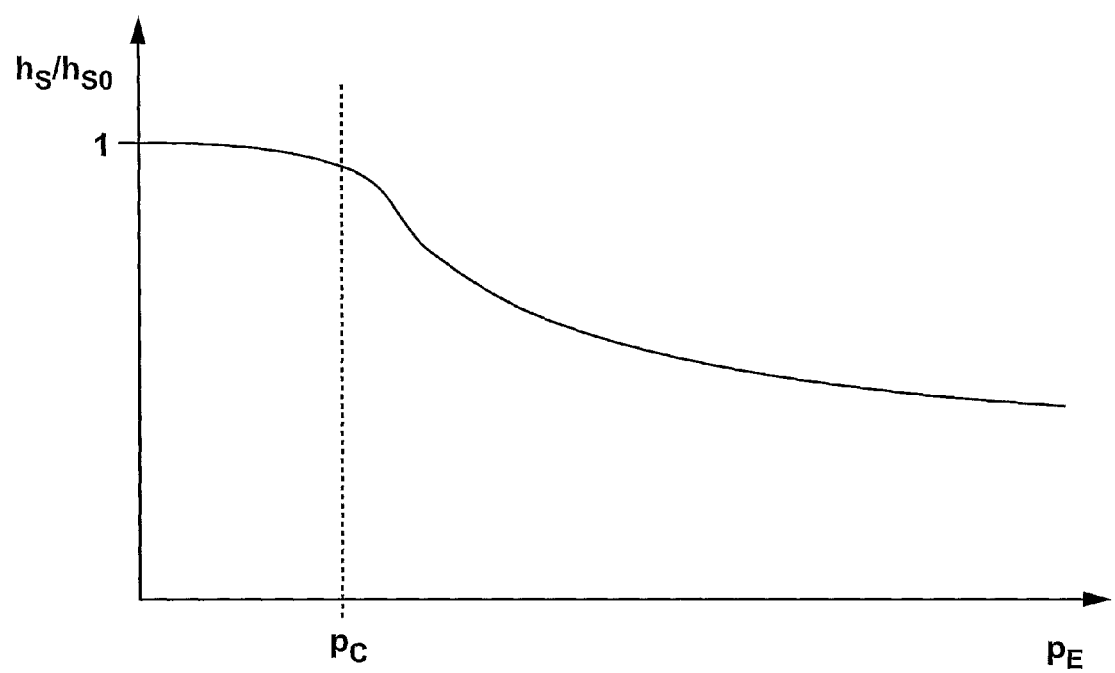
FIG. 7 shows, by way of example, the ratio between the thickness of a compressed substrate and the original thickness of the substrate as a function of the embossing pressure.

With reference to FIG. 7, the substrate 30, for example cardboard, may be compressed due to the effect of the embossing pressure $p_E$. Thus, the ratio between the thickness $h_S$ of the substrate and the initial thickness $h_{S0}$ is reduced to a value substantially smaller than one. As a result, inter alia the bending strength of the substrate is reduced, which is a significant problem, e.g., in product packages. Furthermore, the visual appearance of the substrate may be impaired and the substrate may be bent. Also, during the compression, the surface layer 40 of the substrate 30 may escape from below the embossing member 10 or be unfavourably absorbed into the porous substrate 30, wherein the appearance of the substrate 30 may deteriorate further and/or the substrate 30 may become brittle. In certain cases, it is possible to determine a threshold value $p_c$ for the embossing pressure $p_E$, whereby no collapsing of the substrate 30 or thinning of the surface layer 40 takes place at lower values of the embossing pressure $p_E$. According to the present invention, the embossing may thus be implemented by using values of the embossing pressure $p_E$, which are lower than said threshold value. The embossing pressure is e.g. advantageously lower than or equal to 0.6 MPa.

Figure 8:
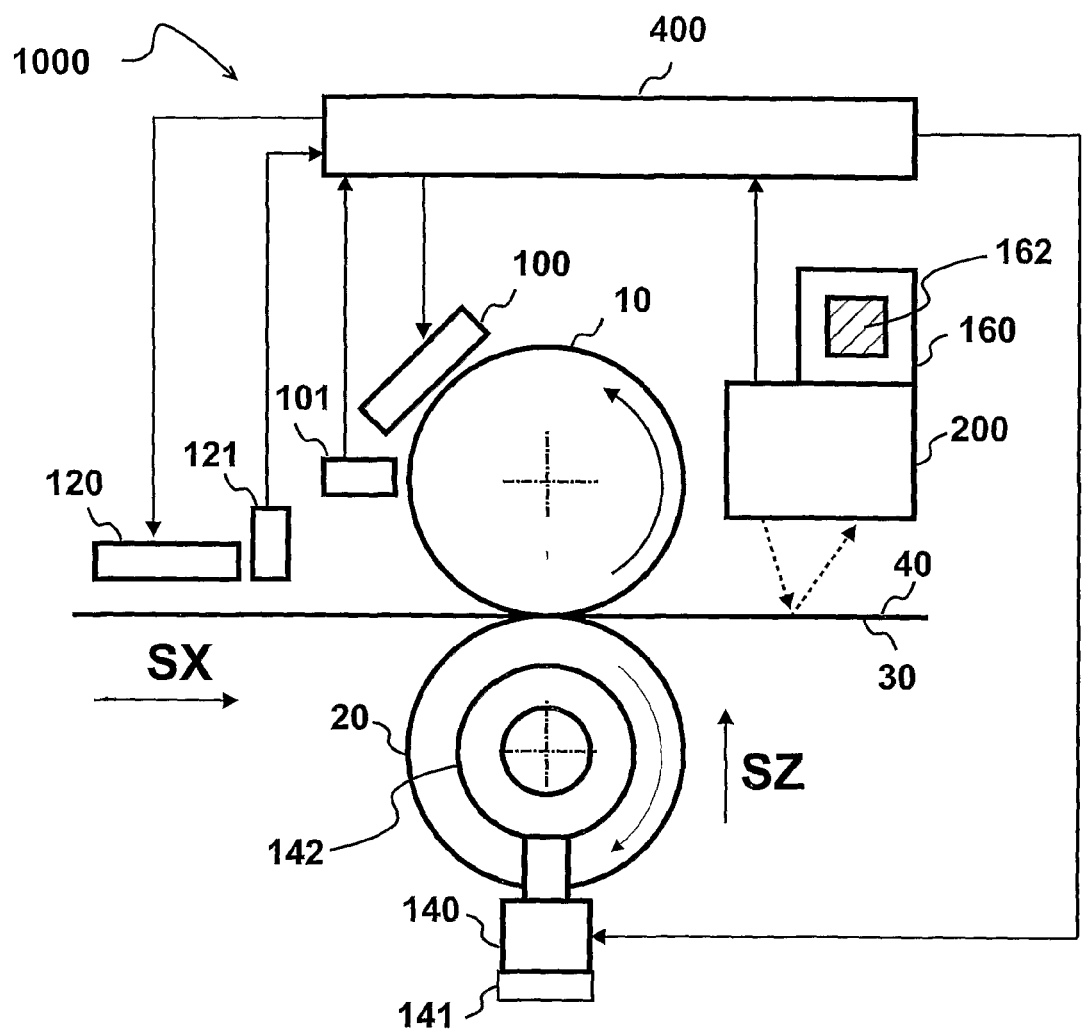
FIG. 8 shows an embossing device according to the present invention.

With reference to FIG. 8, the substrate 30 and its surface layer 40 are pressed between the embossing member 10 and the backing member 20 in the embossing device 1000. In the embodiment according to the figure, the embossing member and the backing member are rotatable rolls. The embossing member 10 and the backing member 20 are rotated by rotation mechanisms whose speed of rotation is adjustable. Thus, the substrate 30 moving in a direction SX is pressed between the embossing member 10 and the backing member 20. The members 10, or the rotating mechanisms are provided with, for example, optical sensors for determining the angular position and the speed of rotation. The embossing temperature may be controlled by adjusting the power of infrared heaters 120 heating the surface layer 40 of the substrate 30 and/or by adjusting the power of inductive heaters 100 heating the embossing member 10. The heating of the embossing member may also be based, in whole or in part, on the use of heat transfer media, such as hot oil. The embossing device 1000 may also comprise inductive heaters 100 or auxiliary rolls heated by electricity or by a heat transfer medium. The embossing roll 10 may comprise thermoelements and pressure sensors for monitoring the pressure and the temperature. The temperatures are monitored, for example, by pyrometric measuring devices 101, 121.

The embossing pressure directed to the surface layer 40 of the substrate 30 by the embossing member 10 and the backing member 20 may be adjusted. The adjusting takes place, for example, by pressure control means 140 coupled to the bearings 142 of the backing member 20, by which the backing member 20 may be moved in the direction SZ. Said pressure control means 140 comprise, for example, one or more hydraulic or pneumatic cylinders 140. The actuators 140 may also operate on the electromechanical principle. Furthermore, the actuator 140 may be fully manual in such a way that, for example, no electric, hydraulic or pneumatic auxiliary energy is needed for performing the control movement. The cylinders 140 may be provided with sensors 141 for detecting the embossing force, i.e. for indirectly detecting also the embossing pressure.

At least one optical measuring device 200 based on diffraction is arranged to measure the intensity of light diffracted from the surface layer 40 of the substrate 30. The substrate 30 may be so large that it cannot be monitored by the measuring device 200 at a time. The measuring device may thus be moved laterally by means of a transfer mechanism 160 along a guide 162, to monitor the whole width or area of the substrate 30.

A control unit 400 controls the temperature control means 100, 120 and/or the pressure control means 140 by on-line adjustment on the basis of a signal of the optical measuring device 200. Consequently, in an advantageous embodiment, the arrangement for controlling the embossing pressure and/or the embossing temperature and comprising the optical measuring device 200 has feedback; in other words, it forms a closed loop control circuit.

Measuring data from temperature sensors 101, 121 and further sensors are also utilized for the control.

According to the present invention, the structures of the embossing device 1000 may be made lighter and they do not need to be as rigid as in a situation in which the shape of the produced micro-protrusions 41 is to be forced to correspond as closely as possible to the shape of the microgrooves 11 of the embossing member 10. The deflection of the rolls remains smaller, such that substantially the same microprotrusion height may be produced on the whole width of the substrate, i.e. the produced diffractive effect is uniform. According to the present invention, the embossing device 1000 may be used to provide the surface layer 40 of the substrate 30 with microstructures at a higher speed. According to the present invention, the embossing device 1000 may be used to produce microstructures on the surface layer 40 of the substrate 30 using a lower embossing temperature. In some cases, the lower embossing temperature reduces the risk of adhesion of the surface 40 of the substrate to the embossing member 10.

Furthermore, it is possible to use materials, which are not resistant to a high embossing temperature or to a high embossing pressure.

Figure 9:
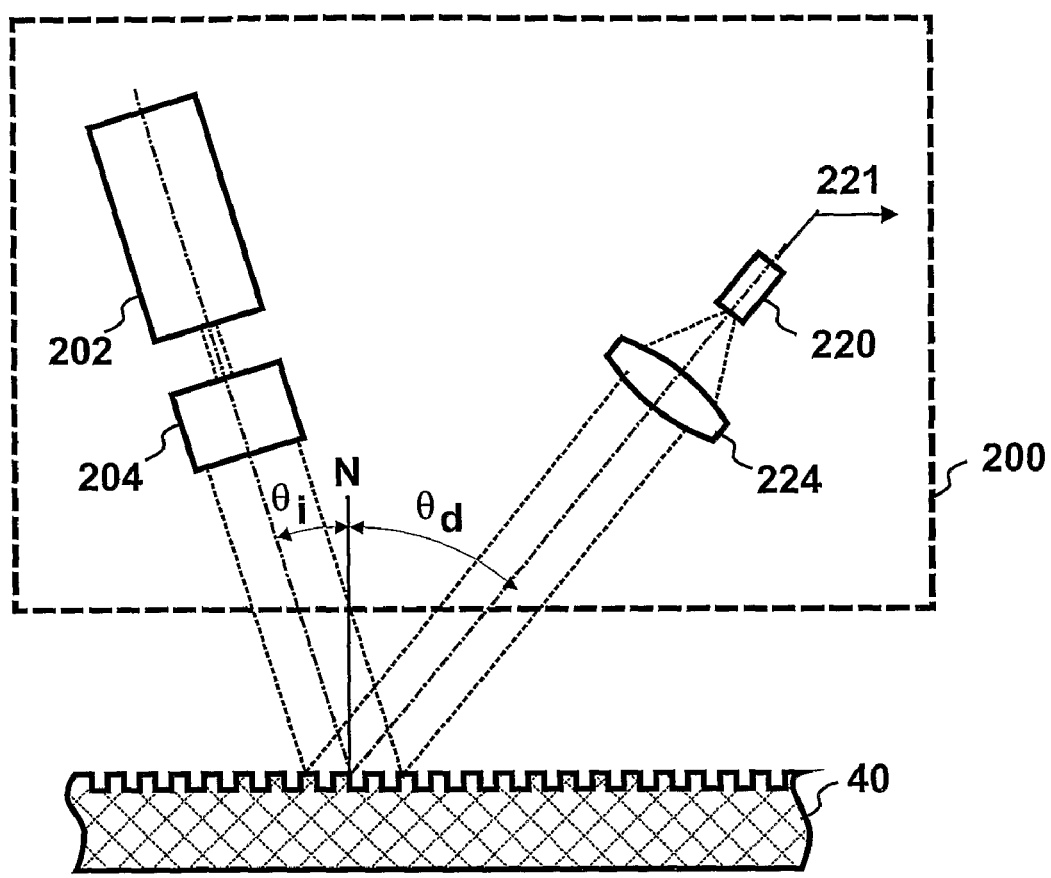
FIG. 9 shows an optical measuring device based on diffraction, which device is suitable for use in an embossing device according to the present invention.

With reference to FIG. 9, the above-mentioned diffraction-based optical measuring device 200 comprises a light source for illuminating the surface 40 of the substrate 30 and a light detector 220 for measuring the intensity of the diffracted light. The light-emitting element 202 of the light source may be, for example, a laser, which emits monochromatic light. The light-emitting element 202 and the optical element 204 form together the light source. The light detector 220 may be e.g. a light diode. The optical element 204 of the light source may be e.g. a lens or a beam expander by which the light is directed to a target area having a given size and shape. The optical element 224 coupled to the light detector 220 may be, for example, a lens for collecting light into the detector 220 from a monitored area. Said optical element 224 and the light detector 220 define together the direction and the monitored area for the detector. A signal 221 provided by the light detector depends on the height r of the micro-protrusions 41 of the microstructure in the target area.

The direction of illumination and the direction perpendicular to the surface layer 40 of the substrate 30 form the angle of illumination $\theta_i$. The direction of viewing and the direction perpendicular to the surface layer 40 of the substrate 30 form the angle of viewing $\theta_d$. The measuring device comprises means for setting the desired angle of illumination $\theta_i$ and the angle of viewing $\theta_d$, irrespective of each other.

It is known that the intensity of diffracted light has a maximum at angles of illumination and viewing which fulfil the equation:

$$n\lambda = d(\sin \theta_d - \sin \theta_i), \qquad (1)$$

where n is an integer denoting the order of diffraction and $\lambda$ is the wavelength of light. The grating constant d was defined above.

It is advantageous to set the angle of illumination and the angle of viewing to meet the condition set by the equation 1. It is particularly advantageous to set the angle of illumination $\theta_i$ and the angle of viewing $\theta_d$ such that the formula I is fulfilled at values of n at −1 or 1 (the first diffraction order).

It is noticed that the diffraction efficiency, i.e. the ratio between the intensity of light diffracting from the microstructure in a given direction and the intensity of light incoming in the microstructure, depends not only on the height of the micro-protrusions 41 but also on the shape of the profile of the micro-protrusions 41 and on the refractive index of the surface 40 of the substrate.

Other embodiments of the optical measuring device 200 based on diffraction are also presented in the patent application "An embossing device and a method for adjusting the embossing device" filed simultaneously with the present patent application.

Figure 10:
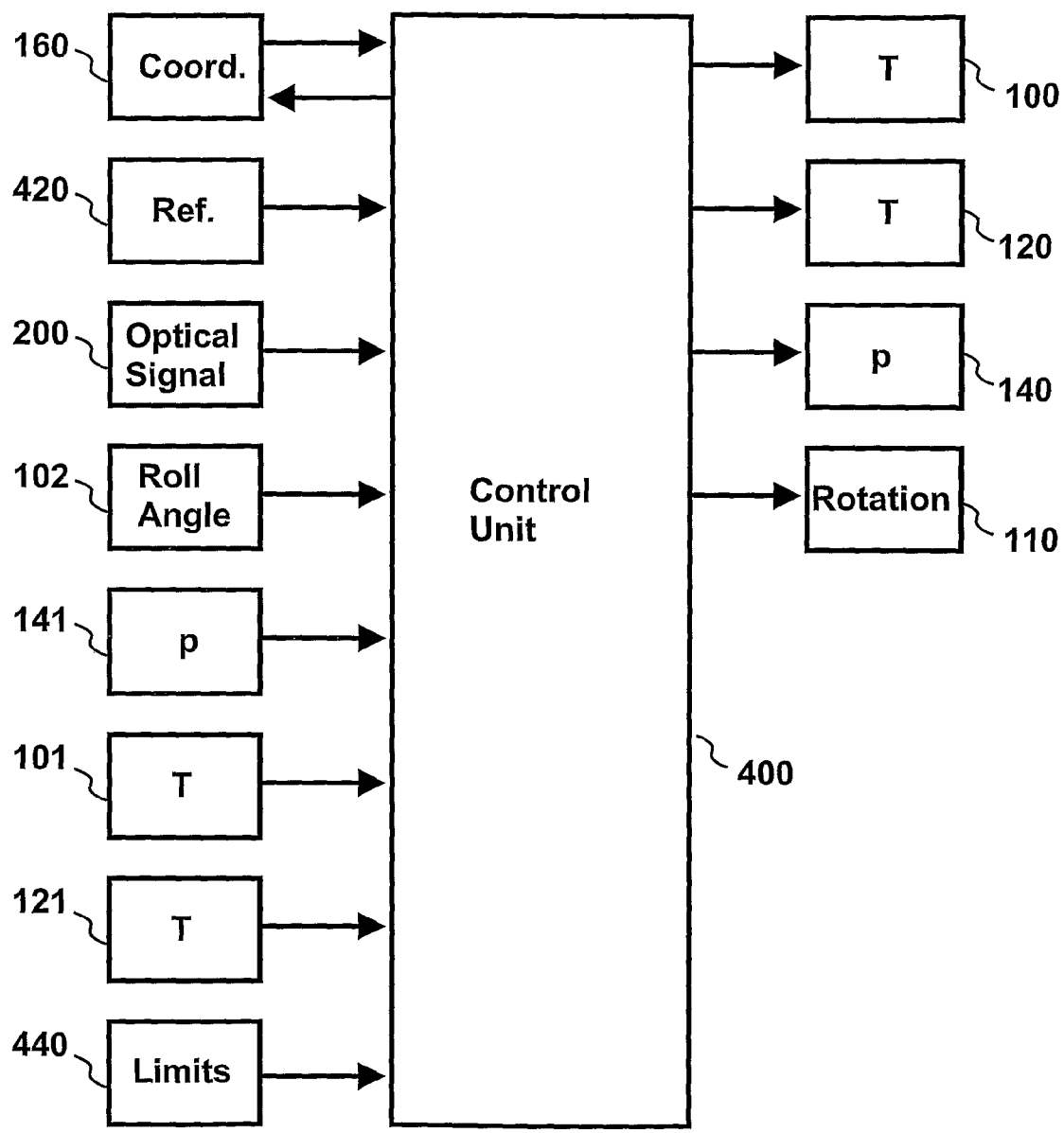
FIG. 10 is a schematic diagram of a control method according to the present invention.

With reference to FIG. 10, the control unit 400 controls the values of temperatures, pressure and speed of rotation of the rolls at least partly on the basis of the signal of the optical measuring device 200. When required, the control unit 400 communicates also with other simultaneous processes, such as a printing process or a coating process, to achieve problem-free cooperation. The control unit 400 monitors the signals from various sensors and measuring devices. The control unit 400 takes care of the protective measures of the system and alarms in failure situations.

The mechanism 160 for moving the optical measuring device 200 and the position sensor 102 of the embossing roll provide information about the position of the monitoring spot or the monitoring area of the measuring device 200 in relation to the substrate. On the basis of the position, a relevant reference value for the signal is selected from a reference value file 420. The signal from the optical measuring device 200 is compared with the reference value in the control unit 400. The reference value may be, for example, 50% of the signal level, which would be achieved if the pattern height r of the microstructure were equal to the depth $r_{OPT}$ providing the maximal diffraction efficiency. For example, if the signal from the optical measuring device 200 is higher than the target level, the embossing pressure is reduced. This is achieved by reducing the embossing force generated by the actuator 140 acting on the backing roll.

In said situation, it is also possible to reduce the temperature of the surface of the embossing roll 10. This is achieved by reducing the heating power of the heating element 100 of the embossing roll 10. A temperature sensor 101 is also utilized for adjusting the temperature. Alternatively, it is also possible to increase the rotational speed of the rotating mechanism 110 of the embossing roll 10. It is also possible to use combinations of different control measures, for example both a change in the temperature and a change in the pressure. Information on the position and the speed of rotation, obtained from the position sensor 102 of the embossing roll 10, and information from the sensors of the embossing pressure 141, connected to the actuators 140, is utilized in the controlling. The temperature of the surface 40 of the substrate may also be adjusted by utilizing the heating element 120 and the temperature sensor 121.

It is not practical to exceed certain limiting values of the parameters. For the embossing pressure, a limiting value $p_c$ may be determined such that at pressures higher than the limiting value the substrate 30 or its surface layer 40 collapses or escapes from below the embossing roll 10. The limiting value for the embossing pressure may also be defined as a function $p_c$ of the temperature and the embossing time. The limiting values are stored in a limiting value file 440 where they are available for the control unit 400. The control unit 400 controls the embossing device such that the limiting values are not exceeded.

The control of the embossing device 1000 may be automatic such that the control operations are carried out on the basis of the absolute value of the measuring signal 221, the relative variations of the measuring signal 221, or the difference between the measuring signal 221 and a reference value. The controls may be implemented using the so-called PID control, whereby the control is carried out on the basis of the difference between the real value and the target value, on the basis of the time integral of said difference, and/or on the basis of the time derivative of said difference.

The control may also be implemented as a so-called fuzzy control on the basis of the measuring signals.

The control may also be made manually such that the user of the embossing device supervises the signals of the measuring devices, e.g. the measuring signal 221, or the parameters computed from them by means of a display device, and performs the control operation manually.

Figure 11A:
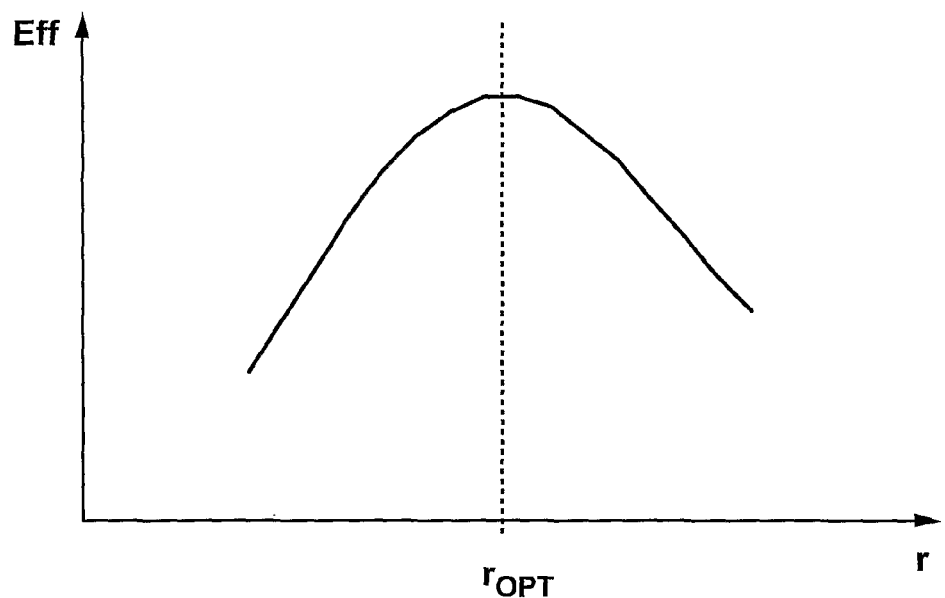
FIG. 11a shows, by way of example, the diffraction efficiency as a function of the height of the micro-protrusion.

FIG. 11a shows typical diffraction efficiency Eff of the microstructure as a function of the height r of the micro-protrusions. The maximum diffraction efficiency is achieved, for example, at a height $r_{OPT}$ of the micro-protrusion, which is typically slightly higher than the quarter of the wavelength of light, e.g. 0.26 times the wavelength of light. Thus, the achieved visual effect is as strong as possible. The diffraction efficiency may be optimized, for example, for the green colour having the wavelength of 550 nm. Consequently, an effect weaker than the maximum may be achieved by producing a microstructure where the height r of the micro-protrusions is greater or smaller than the height $r_{OPT}$ giving the maximum diffraction efficiency.

In this context, when the height r of the micro-protrusions is smaller than 0.3 times $r_{OPT}$, the produced microstructure is herein called a low microstructure. When the height of the micro-protrusions is greater than two times $r_{OPT}$, the produced microstructure is called a super high microstructure. In the case of the wavelength of 550 nm, corresponding to the green light, the height of the micro-protrusions is greater than or equal to 0.26 times 550 nm times two, which, when rounded, gives a criterion of 300 nm. A low microstructure may be used to give a weak effect. A super high microstructure gives typically also an effect, which is weaker than the maximum effect but, on the other hand, the super high microstructure is more resistant to wearing and smudging.

The criterion of a weak effect depends on the observer and on the illumination conditions. In this context, reference conditions are defined, in which the surface layer 40 of the substrate 30 is illuminated in a direction perpendicular to the surface by light having a wavelength of 550 nm, and the diffraction efficiencies are defined in the directions of diffraction according to the diffraction order 1 or −1 according to equation (1). When, under said reference conditions, the stronger of said two diffraction efficiencies is found to be equal to or smaller than 0.01 (that is, 1%), a term weak effect is used in this context. If, under said standard conditions, the stronger of said two diffraction efficiencies is found to be equal to or smaller than 0.001 (that is, 0.1%), a term very weak effect is used in this context, the very weak effect being only barely visible to the eye.

Figure 11B:
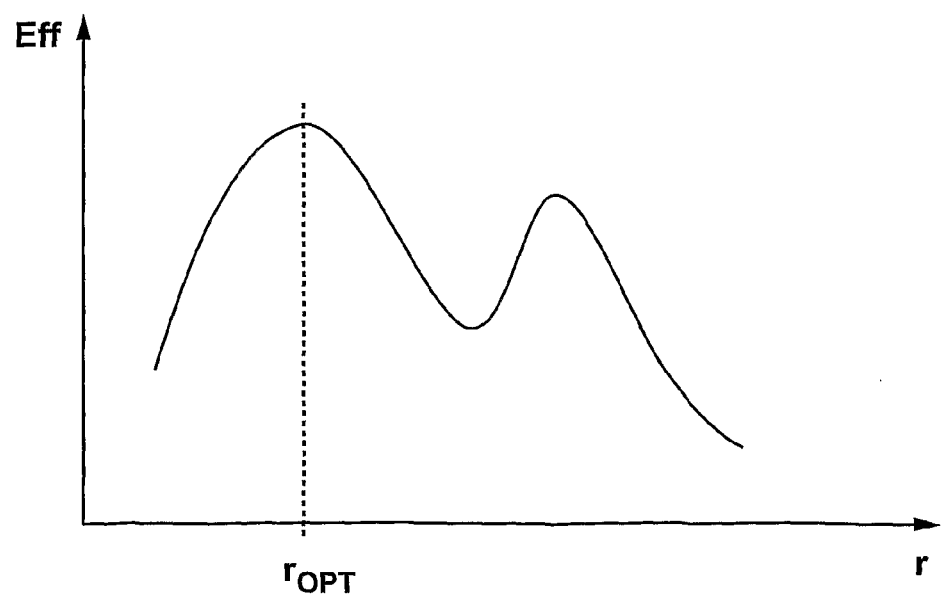
FIG. 11b shows, by way of example, the diffraction efficiency as a function of the height of the micro-protrusion in a situation in which the diffraction efficiency comprises at least two different maxima.

With reference to FIG. 11b, it is noticed that the number of the maxima of the diffraction efficiency may also be greater than one. In such cases, a good efficiency may also be achieved at micro-protrusion heights, which are significantly greater than the quarter of the wavelength.

The diffraction efficiency may be computed by means of diffraction theories described, for example, in Chapter 2 (by Jari Turunen) of the book Micro-Optics, Elements, Systems, and Applications (Taylor & Francis, Cornwall, 1997).

To achieve a desired weak effect or wear-resistant effect using a super high or with a low microstructure, at least 95% of the area of the produced microstructure has to comprise the super high or low microstructure, respectively.

Figure 12:
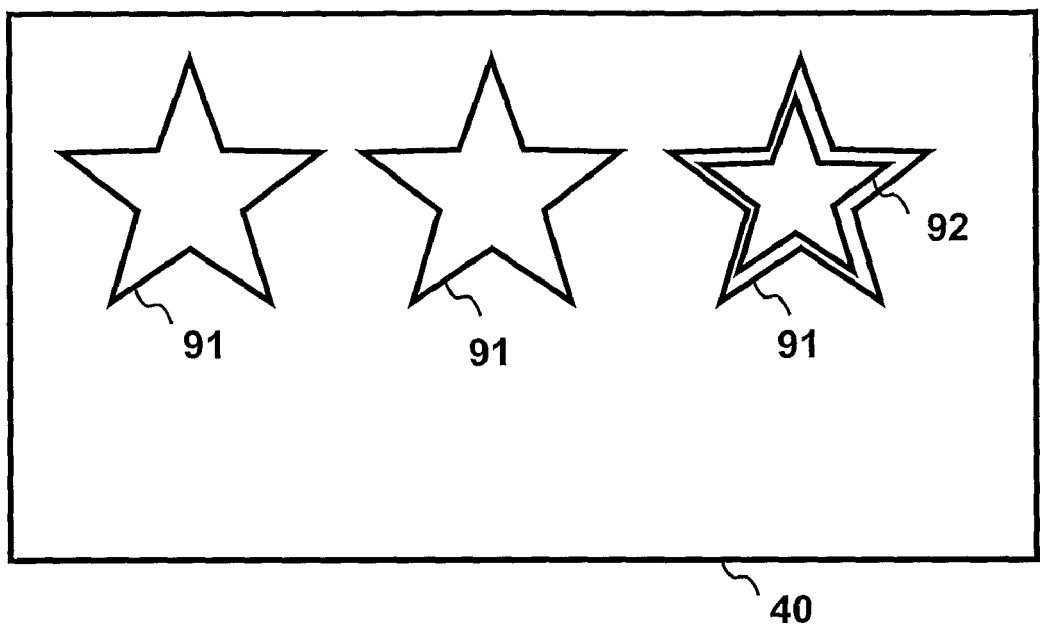
FIG. 12 shows patterns imitating the diffractive effect and which make the detection of the microstructure more difficult.

With reference to FIG. 12, the detection of a pattern 92 having a low microstructure, which is produced on the surface layer 40 of the substrate 30 for the purpose of authentication, may be made more difficult by including symbols or patterns 91 imitating the diffractive effect on the substrate 30 or its surface layer 40 by printing techniques.

According to the present invention, the same embossing member 10 may be used to produce low microstructures, microstructures providing optimal diffraction efficiency, and super high microstructures.

Low microstructures, microstructures providing the optimum diffraction efficiency, and super high microstructures may also be produced in such a way that the cross-sectional area $A_2$ of the produced micro-protrusion 41 is equal or almost equal to the cross-sectional area $A_1$ of the microgroove 11 providing said micro-protrusion 41. In that case, a separate embossing member 10 is needed for producing the low microstructure, the microstructure providing the optimum diffraction efficiency, and the super high microstructure. Then, a low-viscosity surface material 40 of the substrate 30, a high embossing temperature, and/or a high embossing pressure is needed for the producing of the microstructures. Also, the speed of production of the microstructure may need to be compromised.

It will be obvious for a person skilled in the art that the dimensions of the microgrooves and the micro-protrusions are exaggerated in the drawings in order to illustrate the inventive idea.

The invention is not limited solely to the embodiments presented in the above description or in the drawings. The aim is to limit the invention only by the presentation of the scope of the appended claims.

The invention claimed is:

1. A method for producing a diffractive microstructure, said method comprising:
    directing an embossing pressure to the surface layer of a paper or cardboard substrate by a backing member and by an embossing member comprising microgrooves to produce several micro-protrusions, said diffractive microstructure giving a visual effect; and
    adjusting embossing temperature and/or embossing pressure such that at least one micro-groove produces a micro-protrusion whose cross-sectional area is smaller than or equal to 0.9 times the cross-sectional area of said at least one microgroove producing said micro-protrusion.

2. The method according to claim 1, wherein at least 95% of all micro-protrusions produced by said embossing member constitute a group in which the cross-sectional area of each micro-protrusion of said group is smaller than or equal to 0.9 times the cross-sectional area of the microgroove producing said micro-protrusion of said group.

3. The method according to claim 1, wherein at least one produced micro-protrusion has a concave top.

4. The method according to claim 1, wherein the diffraction efficiencies of said diffractive microstructure for the diffraction orders one and minus one are smaller than or equal to 0.01 when light having a wavelength of 550 nm impinges on the surface layer of the substrate in the direction normal to the surface.

5. The method according to claim 1, wherein the height of at least one micro-protrusion is greater than or equal to 300 nanometers.

6. The method according to claim 1, wherein the height of said micro-protrusions is adjusted at least partly by adjusting the embossing pressure.

7. The method according to claim 1, wherein the height of said micro-protrusions is adjusted at least partly by adjusting the embossing temperature.

8. The method according to claim 1, wherein the controlling of the height of said micro-protrusions is based at least partly on a signal provided by an optical measuring device, wherein said optical measuring device has been arranged to measure light diffracted from the surface of the substrate.

9. The method according to claim 1, wherein at least one area of said diffractive microstructure is used to indicate the authenticity of the substrate or of a product attached to the substrate.

10. The method according to claim 1, wherein coloured areas or patterns imitating the diffractive effect are comprised in said substrate or produced on said substrate.

* * * * *